United States Patent [19]
Hashimoto et al.

[11] Patent Number: 4,559,559
[45] Date of Patent: Dec. 17, 1985

[54] NOISE REDUCING CIRCUIT

[75] Inventors: Seiji Hashimoto; Nobuyoshi Tanaka, both of Kanagawa, Japan

[73] Assignee: Canon Kabushiki Kaisha, Tokyo, Japan

[21] Appl. No.: 389,053

[22] Filed: Jun. 16, 1982

[51] Int. Cl.⁴ .................... H04N 5/21; H04N 5/18; H04B 1/10; H04B 15/00
[52] U.S. Cl. .................................... 358/167; 358/172; 328/165
[58] Field of Search ............... 358/167, 177, 176, 178, 358/171, 172, 173, 174, 36; 328/165, 162; 375/104, 11; 455/308, 43, 307; 333/14; 307/543

[56] References Cited
U.S. PATENT DOCUMENTS
4,122,776 10/1978 Tedder .............................. 328/165

Primary Examiner—John C. Martin
Assistant Examiner—Michael P. Dunnam
Attorney, Agent, or Firm—Toren, McGeady, Stanger, Goldberg & Kiel

[57] ABSTRACT

A noise reducing circuit, including a circuit to reduce noises contained in a low frequency band with a clamping circuit, having a first circuit with an attenuating characteristic near a first frequency which is the upper frequency limit of a noise that can be reduced by the clamping circuit and a second circuit with a characteristic of the first circuit. The first circuit is provided in front of the clamping circuit and the second circuit following the clamping circuit.

16 Claims, 4 Drawing Figures

F I G. 1
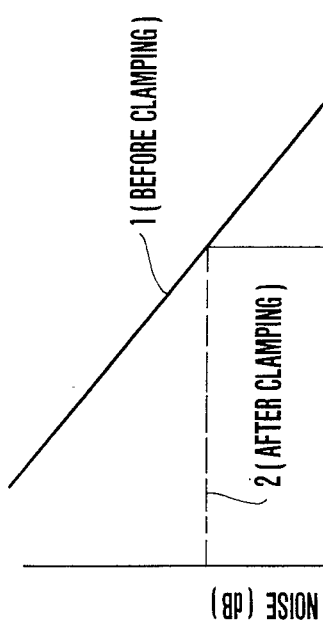
F I G. 2
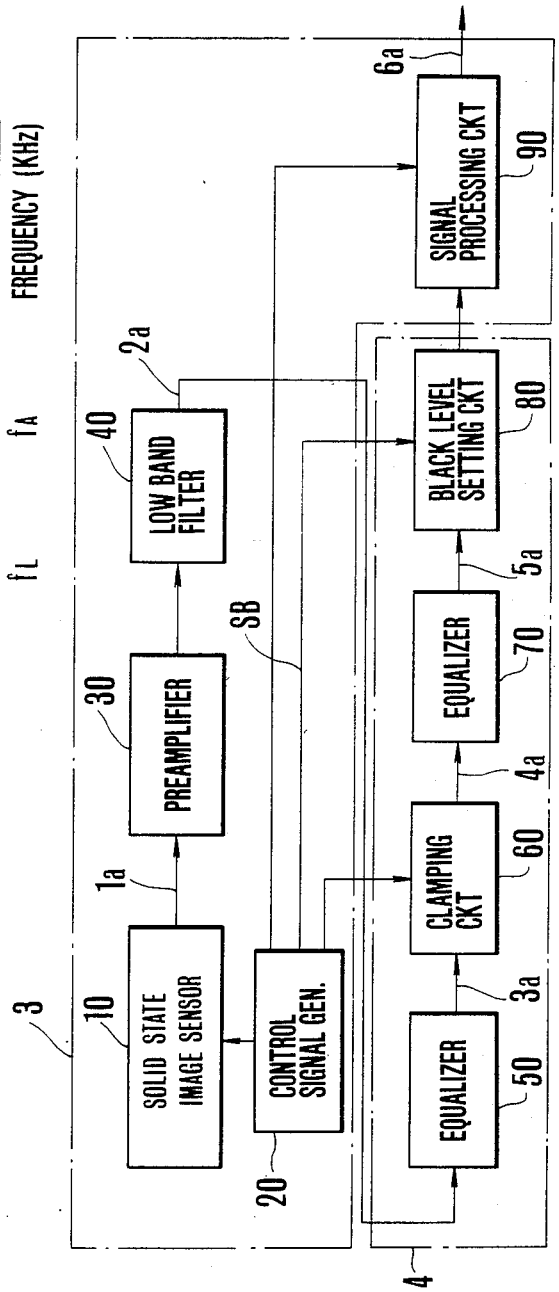

NOISE REDUCING CIRCUIT

BACKGROUND OF THE INVENTION

1. Field of the Invention:

The present invention relates to a noise reducing circuit using a clamping circuit to reduce noises in a low frequency band.

2. Description of the Prior Art:

Description will be made herein by way of an example of a circuit used for reducing noises in a low frequency band of video signals obtained from a solid state image sensor.

While developments of video cameras using a solid state image sensor as an image pick up means are widely known, there still remain a number of disadvantages to be overcome. One of the disadvantages, the sensitivity of a camera, wherein low band noises at the photographing time with low intensity illumination constitute a difficulty in improving the sensitivity. In general, a light shielding layer called an optical black is provided for an image sensor and a video signal corresponding to the light shielding layer is used as an optical reference black signal. A method to compensate a dark current of the image sensor by effecting clamping, using the reference black signal as a reference clamping signal, has been employed.

On the other hand, when a video signal corresponding to an incident light beam is read from an image sensor, the video signal has noise, which is generated from an on-chip amplifier for signal charge detection (hereinafter called "output amplifier") being provided in one chip at an output of a solid state image sensor, added thereto.

For example, when a MOS-FET is used in an output amplifier, a low frequency noise characteristic of the MOS-FET is characterized by such low band noise characteristics shown by the solid line 1 in FIG. 1. The noise characteristic changes at a frequency $f_A$ which may be spotted at several tens of KHz to several hundreds of KHz. Then noise increases as the frequency lowers to a band lower than the frequency $f_A$. Such noise at a low band has the characteristic of being in inverse proportion to the frequency, hence called 1/f noise.

An explanation shall be made as to why a level of noise in a low band contained in a signal is reduced by a clamping circuit. Now a structure is referred to wherein one element of noise (angular frequency $W_h$) is contained in a signal. A ratio $\Delta_h$ of noise reduction in a clamping circuit is represented by the following equation, in which the frequency of a clamping pulse is expressed as $T_H$:

$$\Delta_h = W_h T_h.$$

And if, for example, the above is substituted with $T_H = 63.5$ μs which is a horizontal scanning period of a television and $\Delta_h = 1$, an upper frequency limit which can reduce noise will be about 2.5 KHz.

Here, if the upper frequency limit is represented by $f_L$, and a reference clamping signal containing the above-mentioned 1/f noise is clamped, the distribution of noise will be flat at the frequency $f_L$ or lower. Therefore, when the level of a low band noise is large, the low band noise will be reduced.

Now, a method to reduce the 1/f noise by employing the above-mentioned nature of a clamping circuit may be conceived.

That is, when 1/f noise is passed through a clamping circuit, the noise level will become flat at the threshold frequency $f_L$ as shown by the broken line 2 in FIG. 1, thus low band noises are reduced.

However, since a low band noise has a higher noise level than that of a high band noise by a few to several dB, the low band noise is stressed in photographing with low intensity illumination which is represented by the line-shape noise in a television receiver plane, creating very unsightly video images.

It is an object of the present invention to provide a noise reduction circuit which can reduce with improved efficiency a low band noise by a clamping circuit. Also, it is another object of the present invention to provide an image pick up apparatus which can obtain a video signal in which a low band noise has been satisfactorily reduced. Further objects of the present invention will become clear by the detailed description of preferred embodiments with reference to the attached drawings.

SUMMARY OF THE INVENTION

These and other objects of the invention are attained in a noise reducing circuit which includes a clamping circuit to clamp signals. A first circuit is provided at an input side of the clamping circuit and has an attenuating characteristic at least near a first frequency constituting the upper limit frequency of noises which can be reduced by the clamping circuit. The apparatus also includes a second circuit, provided at an output side of the clamping circuit and which compensates for the characteristic of the first circuit.

BRIEF EXPLANATION OF THE DRAWINGS

FIG. 1 shows an example of a noise characteristic before and after a clamping circuit.

FIG. 2 shows an image pick up apparatus which employs a noise reduction circuit according to the present invention.

DETAILED DESCRIPTION OF PREFERRED EMBODIMENTS

Figure 3:
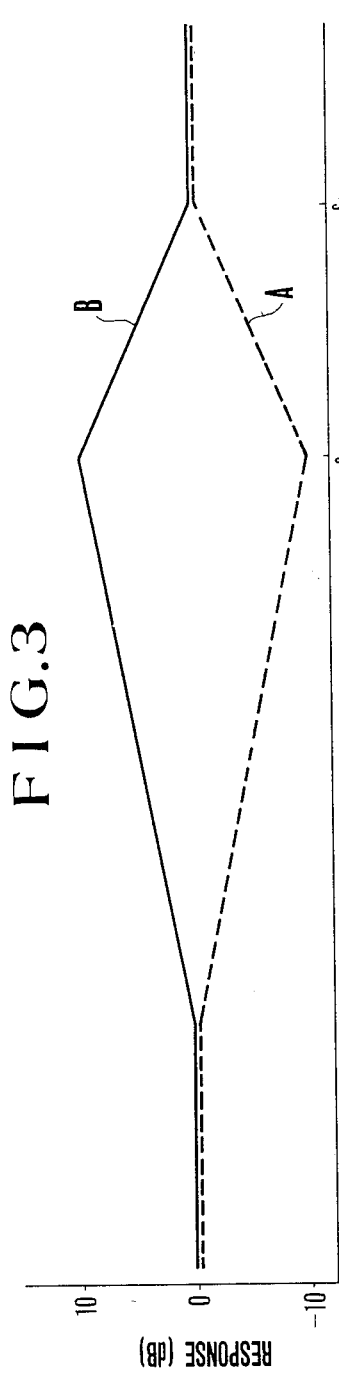
FIG. 3 shows the characteristics of an equalizer circuit according to the present invention.

An example of the present invention will be described referring to FIGS. 2, 3 and 4. In FIG. 2, a block 3, shown by one dot chain line, is an arrangement known in a conventional video camera, and a block 4 is a circuit arrangement to improve a low band noise characteristic.

A solid state image sensor 10 (for example CCD), as an image pick up means, converts light information obtained through a lens (not shown in the drawing), etc. to a video signal, being controlled by a control signal generator 20 for processing the video signal. A preamplifier 30 amplifies a signal read out from the solid state image sensor 10, and a low band filter 40 eliminates a clock element from the video signal connected thereto in succession. After the low band filter 40, there is an equalizer circuit 50 as a first circuit having the characteristics as shown by a line A in FIG. 3. There is a transmission gain near the upper limit frequency $f_L$ at which noises of a clamping circuit can be reduced to a rate which is less than a transmission gain near the above-mentioned frequency $f_A$ at which the low band noise characteristic changes. The equalizer circuit is connected to the low band filter 40. Reference numeral 60 identifies a clamping circuit, and an equalizer circuit 70 has the characteristics shown by a line B of FIG. 3 that compensates the frequency characteristic of the equalizer circuit 50 which is connected to the circuit 60. Reference numeral 80 illustrates a black level setting circuit, and a signal processing circuit 90 produces so-called television signals such as processes, encoder and addition of synchronizing signals, etc. The clamping circuit 60, the black level setting circuit 80, and the signal processing circuit 90 respectively receive a control from the control signal generator 20 to process the video signals.

Figure 4:
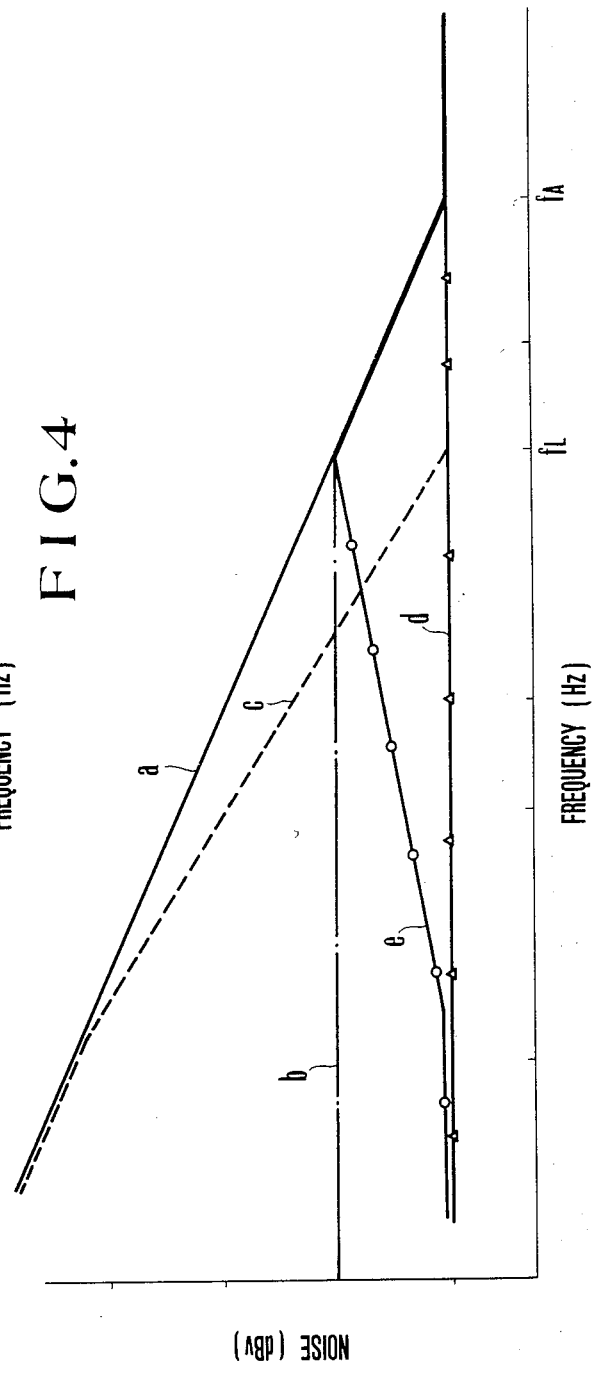
FIG. 4 shows low band noise characteristic improvement in an image pick up apparatus with the arrangement shown in FIG. 2.

Next, explanation shall be made on a noise reduction improvement by the present invention, referring to FIG. 3 and FIG. 4.

First, a signal $1a$ read out at the solid state image sensor 10 is amplified by the pre-amplifier 30 to an appropriate level, only video signal $2a$ passes through the low band filter 40. The video signal $2a$ contains a noise element shown in FIG. $4a$ (in this example $-4$ dB/oct). As the video signal $2a$ is clamped, its noise characteristic will be improved to that shown by FIG. $4b$.

The video signal containing the noise element shown in FIG. $4a$ is first introduced into the equalizer circuit 50. A frequency gain characteristic of an equalizer circuit is, as shown in FIG. 3, such that, for the equalizer 50, a corner frequency $f_A$ with the noise characteristic $1/f$ of an image pick up element output amplifier is set so it comes near a threshold frequency for noise reduction of the clamping circuit, as shown by the broken line A in FIG. 3. Since the equalizer 70 is to compensate the characteristic of the equalizer 50 as shown by the solid line B of FIG. 3, the video signal will go through the equalizer 50 and will become a signal $3a$ (the noise characteristic which is shown by $c$ of FIG. 4) with the corner frequency of the $1/f$ noise element changed from $f_A$ to near $f_L$ KHz. Next, as the signal is sent to the clamping circuit 60 and is clamped, the low band noise will become a signal $4a$ with the same noise level as that of the high band noise (the noise characteristic will be as shown by $d$ of FIG. 4). Furthermore, the changed signal $4a$ goes through the equalizer circuit 70 having its frequency characteristic compensated, thus finally becoming a signal $5a$ with its low band noise improved as shown by $e$ of FIG. 4.

The purpose of providing the black level setting circuit 80 at the rear of the equalizer 70 is that when the image pick up apparatus in this example is connected to a television receiver or a VTR, etc. and is clamped again, it loses the low band noise improvement, thus this shortcoming is eliminated by the black level setting circuit 80. That is, as the noise element corresponding to the above-mentioned frequency $f_L$ is not improved, the noise characteristic in an apparatus without an equalizer circuit, etc. will return to the characteristic of $b$ in FIG. 4 by clamping. Therefore, the reference black signal which constitutes the reference clamping signal for the signal $5a$ is eliminated by a blanking signal SB from the control signal generator 20. At the same time a new reference black signal level not containing noises from the solid state image sensor 10 and the amplifying circuit 30 is set by this even when clamping is repeated. The reference clamping signal remains at a constant level and the signal itself will not change, therefore the low band noise characteristic will not become worse again.

The signal going through the black level setting circuit 80 is sent to the signal processing circuit 90 and will become a television signal.

Since the equalizer circuits 50 and 70 are provided at the front and at the rear of the clamping circuit as mentioned above, an advantage attained is that the low band noise characteristic is further improved, as shown in this example, compared to the conventional noise improvement characteristic, as shown in FIG. 4.

As has been explained above, a first circuit has an attenuating characteristic near a first frequency constituting the upper limit frequency of noises which can be reduced by a clamping circuit, and a second circuit compensates the characteristic of the first circuit in front of and in the rear of the clamping circuit respectively, thereby sufficiently securing the noise reducing capability of the clamping circuit. Thus, a noise reducing device which can remarkably reduce low band noises can be obtained.

While equalizer circuits are used as the most appropriate example for the first circuit and the second circuit in this specification, other types of circuits may be used. For example, a band filter and an amplifier may be used as the first circuit to change a gain only at a desired band, and the band filter and the amplifier which compensate the characteristic of the first circuit may be used in the second circuit.

Also, while a solid state image sensor is used as an image pick up means, other types of image pick up means such as a visi-com, etc. may be used.

Furthermore, while the present invention is applied to noise reduction of a video signal, a low band noise can be reduced in any type signal.

As has been explained above, a noise reducing circuit which can satisfactorily reduce a low band noise can be provided according to the present invention. Also an image pick up apparatus can be provided, which can read out video signals with low band noises satisfactorily reduced.

What is claimed is:

1. A noise reducing circuit, comprising:
   (a) a clamping circuit to clamp signals;
   (b) a first circuit, being provided at an input side of said clamping circuit and having such characteristic as having an attenuating characteristic at least at a first frequency constituting the upper limit frequency of noises which can be reduced by said clamping circuit; and
   (c) a second circuit, being provided at an output side of said clamping circuit and having a characteristic to emphasize the output signal of the clamping circuit, at least said first frequency thereof.

2. A noise reducing circuit, according to claim 1, having such features that the above-mentioned noises have a second frequency at which a frequency characteristic of noise level changes, and the noise level will be almost in inverse proportion to frequency at bands below said second frequency.

3. A noise reducing circuit according to claim 2, in which the first circuit has a nature to lower the above-mentioned second frequency down nearer to the above-mentioned first frequency.

4. A noise reducing circuit according to claim 1, in which the above-mentioned first circuit includes an equalizer circuit.

5. A noise reducing circuit according to claim 1, or claim 4 in which the above-mentioned second circuit includes an equalizer circuit.

6. An image pick-up apparatus, comprising:
   (a) an image pick up means to convert light information into a video signal;
   (b) an amplifying circuit to amplify the video signal obtained by said image pick up means;
   (c) a clamping circuit to clamp the video signal amplified by said amplifying circuit;
   (d) a first circuit being provided at an input side of said clamping circuit, and having an attenuating characteristic at least at a first frequency constituting the upper limit frequency of noises which can be reduced by said clamping circuit; and
   (e) a second circuit being provided at an output side of said clamping circuit and having a characteristic to emphasize the output signal of the clamping circuit, at least said frequency thereof.

7. An image pick up apparatus according to claim 6, having such features that the above-mentioned noises have a second frequency at which a frequency characteristic of noise level changes, and the noise level will be almost in inverse proportion to frequency at bands below said second frequency.

8. An image pick up apparatus according to claim 7, in which the above-mentioned first circuit has such nature as lowering the above-mentioned second frequency down nearer to the above-mentioned first frequency.

9. An image pick up apparatus according to claim 7, in which the above-mentioned noises are mainly generated from the above-mentioned amplifying circuit.

10. An image pick up apparatus according to claim 9, in which as the above-mentioned amplifying circuit, metal oxide semi-conductors-field effect transistors (MOS-FET) are used.

11. An image pick up apparatus according to claim 9, in which the above-mentioned image pick up means includes a solid state image sensor.

12. An image pick up apparatus according to claim 7, in which a clamping cycle of the clamping circuit is a cycle of a horizontal synchronizing signal of the video signal.

13. An image pick up apparatus according to claim 6, which further comprises a low band filter being provided between the amplifying circuit and the clamping circuit and eliminating clock elements in the video signal.

14. An image pick up apparatus according to claim 6, in which the above-mentioned first circuit includes an equalizer circuit.

15. An image pick up apparatus according to claim 6 or claim 14, in which the above-mentioned second circuit includes an equalizer circuit.

16. An image pick up apparatus according to claim 6, which further comprises a black level setting circuit being provided after the second circuit and setting a black level of the video signal at a new value.

* * * * *